US011401739B2

(12) United States Patent
Suholutskaja

(10) Patent No.: US 11,401,739 B2
(45) Date of Patent: Aug. 2, 2022

(54) ACTUATION DEVICE FOR A MOTOR VEHICLE LOCK

(71) Applicant: Kiekert AG, Heiligenhaus (DE)

(72) Inventor: Elena Suholutskaja, Dusseldorf (DE)

(73) Assignee: Kiekert AG, Heiligenhaus (DE)

( * ) Notice: Subject to any disclaimer, the term of this patent is extended or adjusted under 35 U.S.C. 154(b) by 758 days.

(21) Appl. No.: 15/762,138

(22) PCT Filed: Sep. 22, 2016

(86) PCT No.: PCT/DE2016/100444
§ 371 (c)(1),
(2) Date: Mar. 22, 2018

(87) PCT Pub. No.: WO2017/050320
PCT Pub. Date: Mar. 30, 2017

(65) Prior Publication Data

US 2018/0274268 A1 Sep. 27, 2018

(30) Foreign Application Priority Data

Sep. 25, 2015 (DE) ..................... 10 2015 116 283.0

(51) Int. Cl.
*E05B 77/24* (2014.01)
*E05B 77/28* (2014.01)
(Continued)

(52) U.S. Cl.
CPC ............ *E05B 77/245* (2013.01); *E05B 77/26* (2013.01); *E05B 77/265* (2013.01); *E05B 77/28* (2013.01); *E05B 81/16* (2013.01); *E05B 81/06* (2013.01)

(58) Field of Classification Search
CPC ........ E05B 77/26; E05B 77/28; E05B 77/265; E05B 77/245; E05B 77/283; E05B 81/16;
(Continued)

(56) References Cited

U.S. PATENT DOCUMENTS 3,998,482 A * 12/1976 Nozaki ................. E05B 85/243 292/216
5,699,685 A * 12/1997 Jahrsetz .................. E05B 77/48 180/287
(Continued)

FOREIGN PATENT DOCUMENTS

DE 19819603 C2 8/2000
DE 100 44 613 A1 10/2001
(Continued)

OTHER PUBLICATIONS

Machine Translation of DE 10044613 A1,2020, pp. 1-7 (Year: 2020).*
(Continued)

*Primary Examiner* — Christine M Mills
*Assistant Examiner* — Yahya Sidky
(74) *Attorney, Agent, or Firm* — Renner, Otto, Boisselle & Sklar, LLP

(57) ABSTRACT

An actuation device for a lock of a motor vehicle, said actuation device allowing a plurality of functions without requiring a large number of parts and/or a complex and/or voluminous structure. This is achieved in that the actuation device according to the claims for opening a locking mechanism of a motor vehicle lock comprises an anti-theft device, a central locking device, and a childproof lock device. A multifunction coupling lever is provided which is capable of opening a locking mechanism of a motor vehicle lock by means of an opening movement. The opening movement of the multifunction coupling lever can be prevented by the anti-theft device, the central locking device, and the childproof lock device. Thus, an actuation device is provided which is capable of performing a plurality of functions while comprising few components. Because only a few components are required, the structural complexity can be low.

14 Claims, 1 Drawing Sheet

(51) Int. Cl.
*E05B 81/16* (2014.01)
*E05B 77/26* (2014.01)
*E05B 81/06* (2014.01)

(58) Field of Classification Search
CPC ............... E05B 81/06; Y10T 292/1047; Y10T 292/1082; Y10S 292/23
See application file for complete search history.

(56) References Cited

U.S. PATENT DOCUMENTS

| | | | | | |
|---|---|---|---|---|---|
| 5,802,894 | A * | 9/1998 | Jahrsetz | E05B 77/48 | 292/144 |
| 5,836,639 | A * | 11/1998 | Kleefeldt | E05B 81/22 | 296/155 |
| 6,062,613 | A * | 5/2000 | Jung | E05B 81/06 | 292/201 |
| 6,116,664 | A * | 9/2000 | Wegner | E05B 81/66 | 292/201 |
| 6,338,508 | B1 * | 1/2002 | Kleefeldt | E05B 81/06 | 292/201 |
| 6,764,113 | B1 * | 7/2004 | Cetnar | E05B 81/06 | 292/201 |
| 6,800,958 | B1 * | 10/2004 | Baer | B60R 16/027 | 307/10.1 |
| 6,877,348 | B2 * | 4/2005 | Buecker | E05B 81/66 | 292/201 |
| 8,960,736 | B2 * | 2/2015 | Graute | E05B 81/06 | 292/200 |
| 10,072,445 | B2 * | 9/2018 | Barmscheidt | E05B 85/243 | |
| 10,112,559 | B1 * | 10/2018 | Cimpean | E05B 81/16 | |
| 10,214,945 | B2 * | 2/2019 | Cetnar | E05B 77/02 | |
| 10,309,129 | B2 * | 6/2019 | Suholutskaja | E05B 77/06 | |
| 10,450,780 | B2 * | 10/2019 | Tomaszewski | E05B 81/16 | |
| 10,525,908 | B2 * | 1/2020 | Cimpean | B60R 16/0222 | |
| 10,526,818 | B2 * | 1/2020 | Rosales | E05B 77/06 | |
| 10,563,434 | B2 * | 2/2020 | Reddmann | E05B 81/06 | |
| 10,597,911 | B2 * | 3/2020 | Bendel | E05B 81/54 | |
| 10,808,433 | B2 * | 10/2020 | Im | E05B 83/16 | |
| 10,815,706 | B2 * | 10/2020 | Mittelbach | E05B 81/16 | |
| 10,829,965 | B2 * | 11/2020 | Farris | E05B 77/245 | |
| 2006/0049639 | A1 * | 3/2006 | Menke | B60J 5/0416 | 292/1 |
| 2015/0035300 | A1 * | 2/2015 | Taylor | E05B 81/16 | 292/337 |
| 2016/0258194 | A1 * | 9/2016 | Rosales | E05B 77/06 | |
| 2018/0274268 | A1 * | 9/2018 | Suholutskaja | E05B 77/28 | |
| 2018/0371805 | A1 * | 12/2018 | Ichinose | E05B 77/26 | |
| 2019/0292816 | A1 * | 9/2019 | Topfer | E05B 79/20 | |
| 2019/0316388 | A1 * | 10/2019 | Gotzen | E05B 85/02 | |

FOREIGN PATENT DOCUMENTS

| | | | | |
|---|---|---|---|---|
| DE | 103 20 439 | A1 | 11/2004 | |
| DE | 102005049304 | A1 | 4/2006 | |
| DE | 10 2005 052190 | A1 | 5/2007 | |
| DE | 20 2007 010 301 | U1 | 12/2008 | |
| DE | 10 2011 005 758 | A1 | 9/2012 | |
| EP | 0 826 855 | A2 | 3/1998 | |
| EP | 1146186 | A2 | 10/2001 | |
| EP | 3029230 | A1 * | 6/2016 | E05B 77/245 |

OTHER PUBLICATIONS

Machine Translation of DE 102005052190 A1, 2020, pp. 1-11 (Year: 2020).*
International Search Report and Written Opinion for corresponding Patent Application No. PCT/DE2016/100444 dated Dec. 8, 2016.

* cited by examiner

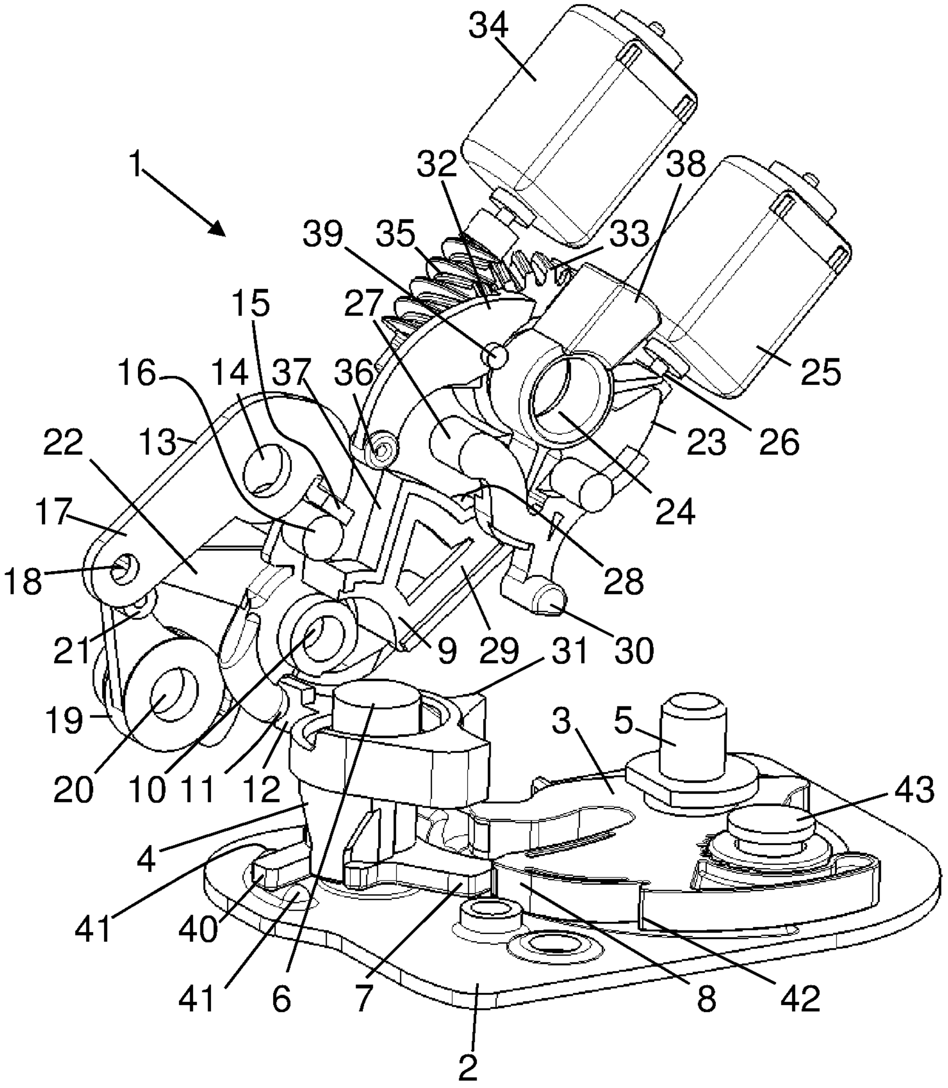
34
1
32
38
39
35
33
15
27
16
14
37
36
25
22
13
23
26
17
24
18
28
21
9
29
31
30
19
3
5
20
10
11
12
43
4
41
40
41
6
7
8
42
2

ACTUATION DEVICE FOR A MOTOR VEHICLE LOCK

The invention relates to an operating device for a motor vehicle latch.

A latch or a latching device for a motor vehicle has a locking mechanism which is generally formed of a catch and a pawl for ratcheting of the catch. If the catch is ratcheted, a locking bolt—also known as a latch holder—of a door or a flap can no longer leave the locking mechanism. The door or flap is then latched. With the aid of the operating device, the pawl is moved out of its ratchet position in order to thus open the door or flap.

An internal operating lever of an operating device enables opening, i.e. unratcheting of the locking mechanism from the motor vehicle interior. An external operating lever, for example a door handle accessible from the outside of an operating device enables opening of the locking mechanism.

Other details regarding the construction and function of a motor vehicle latch with an operating device are described in publication DE 10 2011 005 758 A1. The characteristics of the latching device and the latch stated in the stated publication and in the introduction to the description can also be a component of the present invention, individually or in combination.

A latching device with a ratcheted locking mechanism can also be bolted. In the bolted state, the locking mechanism cannot be unratcheted, i.e. opened, by means of operation of the external operating lever. Bolting or unbolting can occur with the aid of a key, for example, or completely electronically by means of remote control.

A latching device regularly has central locking which enables simultaneous bolting and unbolting of all doors and mostly also flaps, such as the tailgate or fuel flap. The central locking can in turn be operated with the aid of a key and/or a remote control.

A latching device can encompass a child lock, i.e. one or several locking devices which prevent opening from the inside. The possibility of opening a door or flap from the inside of a motor vehicle by operation of an internal operating lever can therefore be prevented by means of an activated child lock. A child lock is generally only provided for the rear doors of a motor vehicle.

A latching device for a motor vehicle also regularly encompasses an anti-theft lock. If the anti-theft lock is activated, a latch of a motor vehicle can neither be opened from inside nor outside by operation of an internal or an external operating lever.

Publication DE 20 2007 010 301 U1 publishes a latching device with an anti-theft lock, a child lock and central locking. Publication DE 10 2005 052 190 A1 publishes a motor vehicle latch with a coupling element which can assume at least three positions in respect of operating lever chains and hereby can activate and deactivate the internal operating lever chain, the external operating lever chain or both. The child lock and anti-theft lock can thus be activated or deactivated.

It is a task of the invention to create an operating device for a latch of a motor vehicle with which a multitude of functions can be realized without the requirement for a large number of components and/or a complex and/or bulky construction.

The task of the invention is solved by an operating device with the characteristics of the disclosure. Advantageous designs result from the disclosure.

An operating device according to the disclosure for opening of a locking mechanism of a motor vehicle latch encompasses an anti-theft device, a central locking device and a child lock device. There is a multifunctional coupling lever which is capable of opening a locking mechanism of a motor vehicle latch by means of an opening movement. This opening movement of the multifunctional coupling lever can be prevented by means of the anti-theft lock device, the central locking device and the child lock device. An operating device is thus available which is capable of fulfilling a multitude of functions with few components. As only relatively few components are required, the constructional cost can be low.

In order to effect the opening movement of the multifunctional coupling lever, there is an operating lever which is coupled with the multi-functional coupling lever. If the operating lever is operated, its movement is thus transferred to the multifunctional coupling lever such that the multifunctional coupling lever executes its opening movement. The locking mechanism is opened by means of the opening movement.

The anti-theft lock device, the central locking device and/or the child lock device can prevent the opening movement of the multifunctional coupling lever in particular by uncoupling the operating lever from the multifunctional coupling lever. In the activated state of the anti-theft lock device, the central locking device and the child lock device there is therefore no coupling between the operating lever and the multifunctional coupling lever. The consequence of this is that operation of the operating lever is not capable of moving the multifunctional coupling lever and opening of the locking mechanism is prevented.

The anti-theft lock device, the central locking device and/or the child lock device can prevent the opening movement of the multifunctional coupling lever additionally in particular by these blocking an opening movement. The anti-theft lock device, the central locking device and/or the child lock device are at least in a preferred embodiment able to prevent the opening movement of the multifunctional coupling lever by means of blockage. A blockage is present when the multifunctional coupling lever cannot move according to its opening movement because a component of the anti-theft lock device, the central locking device and/or the child lock device blocks the path which needs to be moved along the multifunctional coupling lever for moving.

The multifunctional coupling lever is preferably held in a starting position, also known as a 0-position, by means of a spring, for example, if no external force impacts on the multifunctional coupling lever. If the multifunctional coupling lever is pivoted in a first direction from the starting position, the locking mechanism is thus opened. If, starting from the starting position, the multifunctional coupling lever is pivoted into a second, for example an opposite, direction, it is thus uncoupled by an internal operating lever. An operating movement of the internal operating lever then no longer means that the multifunctional coupling lever hereby performs an opening movement. Activation of the anti-theft lock device, the central locking device and/or the child lock device then causes the multifunctional coupling lever to be pivoted according to the second direction, thus preventing an opening movement of the multifunctional coupling lever.

In one configuration, the multifunctional coupling lever has a towing arm arranged adjacent to the rotational axis of the multifunctional coupling lever. Adjacent to the rotational axis means that this towing arm is located relatively close to the axis around which the multifunctional coupling lever can be rotated, compared to other lever arms of the multifunctional coupling lever. Beneficial lever ratios are thus possible in the multifunctional coupling lever in order to be able to open a locking mechanism with little force expenditure. In one configuration, the operating lever is an internal operating lever which causes the opening movement of the multifunctional coupling lever by pivoting. This internal operating lever can only be operated on the inside of a pertaining door or flap for opening.

In addition to the internal operating lever, in one configuration there is an external operating lever which can be operated externally in order to open a door or flap.

In one configuration the operating lever, in particular the internal operating lever, has a contact surface which lies adjacent, for example, on a laterally protruding pin of the multifunctional coupling lever for transfer of a movement of the internal operating lever on the multifunctional operating lever in order to thus cause the opening movement. In order to enable such an extensive contact surface for reliable functioning between the contact surface and the pin in a technically simple manner, the contact surface of the operating lever is preferably provided by a bended bracket. Furthermore, such a large contact surface is thus provided without requiring an excessive amount of material. If, in a respective configuration, the multifunctional lever is pivoted from the aforementioned starting position into the above-named second direction, the contact surface of the operating lever can thus no longer lie adjacent on the multifunctional coupling lever. The operating lever is then uncoupled from the multifunctional coupling lever. Operation of the operating lever can then not cause an opening movement of the multifunctional coupling lever.

In one configuration, the child lock device has a child lock lever which blocks an opening movement of the multifunctional coupling lever with an activated, i.e. engaged child lock. In addition, the multifunctional coupling lever is thus preferably moved by engagement of the child lock that the operating lever is uncoupled from the multifunctional coupling lever. Operation of the operating lever can then no longer cause the multifunctional coupling lever to be jointly moved. In two respects, opening of a door from the inside can thus be prevented.

In one configuration, the anti-theft lock device encompasses an anti-theft lock lever which lies adjacent in the case of an engaged, i.e. activated, anti-theft lock on a contact surface of the multifunctional coupling lever and thus prevents or at least impedes the opening movement. In particular by pivoting of the anti-theft lock lever the multifunctional coupling lever is also moved in such a way that an internal operating lever is uncoupled from the multifunctional coupling lever. In two ways, it is thus prevented that a door or flap can be opened unintentionally.

An electrical drive is preferably present by means of which the anti-theft lock lever can be pivoted in order to thus activate or deactivate the anti-theft lock. This electrical drive which is an electromotor in particular is preferably only provided for the anti-theft lock lever so that this electrical drive is independent from other electrical drives. This can provide especially reliable protection from theft.

The central locking device preferably has a central locking lever which is capable of lying adjacent on a contact surface of the multifunctional coupling lever for prevention of the opening movement, in particular by means of a laterally protruding locking bolt. Pivoting of the central locking lever into the bolting position also has the consequence in particular that the multifunctional coupling lever is uncoupled in turn from an internal operating lever in order to ensure in two ways that a door or flap is bolted especially reliably.

The contact surface of the multifunctional coupling lever for the central locking lever preferably has a greater distance to the axis of the multifunctional coupling lever than the contact surface of the multifunctional coupling lever for the anti-theft lock lever. The consequence of this is that due to lever ratios bolting takes place with a greater force compared to the force exerted by the anti-theft lock on the multifunctional coupling lever in order to block an opening movement or at least prevent such a movement and/or in order to uncouple the operating lever of the multifunctional coupling lever. This is advantageous because the anti-theft lock only supplements bolting.

In an advantageous configuration, the two aforementioned contact surfaces for the anti-theft lock lever and the central locking lever are separated by a step. Only one lever arm of the multifunctional coupling lever with a step is required in order to provide the two contact surfaces for the anti-theft lock device and the bolting device in a spatially suitable manner with little installation space.

Advantageously, an electrical drive is present with which the central locking lever can be pivoted. It is thus possible to provide an electrical central locking unit. An electromotor is predominantly suitable as an electrical drive. The central locking device preferably encompasses an external bolting arm which is capable of uncoupling an external operating lever by means of a pivoting movement via an additional mechanism such that operation of the external operating lever cannot cause an opening movement of the locking mechanism. However, if the external operating lever is coupled, an operation of the external operating lever results in opening of the locking mechanism.

The anti-theft lock lever of the anti-theft lock device and the central locking lever of the central locking device are preferably rotatably mounted on a common axis. The number of components is thus kept low. A compact design is thus enabled in an improved manner.

The axes of rotatably mounted components of the operating device are preferably aligned vertically to the catch and pawl axes in order to enable a compact design and in order to enable beneficial lever ratios.

The invention is explained in further detail hereafter on the basis of FIG. 1.

FIG. 1 shows a latching device with an operating device and with a locking mechanism, and also a latching device 1 for a door or a flap of a motor vehicle. A fork-shaped catch 3 and a pawl 4 are rotatably mounted on a latch plate 2. The catch 3 can be pivoted around its axis 5. The catch axis 5 is attached to the latch plate 2. The catch 4 can be pivoted around its axis 6. The pawl axis 6 is also attached to the latch plate 2. If the locking mechanism comprising the catch 3 and the pawl 4 is ratcheted, a ratchet arm 7 of the pawl 4 thus lies adjacent on an arm 8 of the catch as in FIG. 1. The catch 3 can then no longer be rotated in the opening direction, i.e. viewed in a top view on the catch axis 5 and in a top view on the latch plate 2 in a clockwise direction around the catch axis 5.

In order to open the locking mechanism, the pawl 4 viewed in a top view of the pawl axis 6 and in a top view of the latch plate 2 must be pivoted in a clockwise direction around the pawl axis 6. The envisaged operating device encompasses a multifunctional coupling lever 9 which can be pivoted around an axis area 10. The axis of the multifunctional coupling lever is not illustrated. The multifunctional coupling lever is located in its starting position (0-position shown) in FIG. 1.

A towing arm 11 of the multifunctional coupling lever 9 lies adjacent on a triggering arm 12 of the pawl 4. However, the triggering arm 12 can also be part of a triggering lever which is coupled with the pawl 4 so that a rotational movement of the triggering lever is transferred to the pawl. For manufacturing reasons, such a dual component construction encompassing a pawl and a triggering lever can be expedient. The triggering lever and pawl are accommodated by means of a common axis 6.

If the multifunctional coupling lever 9 is pivoted in an anti-clockwise direction, the towing arm 11 thus pivots the triggering arm 12 and thus the pawl 4 in a clockwise direction in a top view on the axis 6 and in a top view on the plate 2. The ratchet arm 7 is hereby pivoted out of the ratchet position shown and the locking mechanism is thus opened. If the multifunctional coupling lever 9 is therefore pivoted in an anti-clockwise direction starting from its starting position, it thus executes the stated opening movement.

The towing arm 11 is located close to the axis area 10 and is thus arranged adjacent to a relevant axis of the multifunctional coupling lever 9.

In order to pivot the multifunctional coupling lever 9 in the opening direction in an anti-clockwise direction around its axis area 10, there is an internal operating lever 13, which can be pivoted around its axis area 14. The internal operating lever 13 preferably encompasses an angular contact surface 15 which lies adjacent in the starting position on a pin 16 of the multifunctional coupling lever 9. The cylindrical pin 16 preferably protrudes vertically from an arm of the multifunctional coupling lever 9.

This protrusion enables a relatively large contact surface between the pin 16 and the contact surface 15 which advantageously contributes to reliable and malfunction-free operation without needing to use excessive amounts of material. The contact surface between the internal operating lever 13 and a lever arm of the multifunctional coupling lever 9, which enables an opening movement of the multifunctional coupling lever 9 by means of operation of the internal operating lever 13 preferably has, as shown in FIG. 1, a greater distance to the axis area 10 of the multifunctional coupling lever 9 than the distance between the towing arm 11 and the axis area 10 of the multifunctional coupling lever 9. Hereby, a locking mechanism can be opened by operation with low force expenditure. The lever ratio is preferably 1.2:1 and more and preferably less than 2:1.

The internal operating lever 13 has an operating arm 17 with a bore 18 for an attachment of a rod or a Bowden cable not shown. The rod or the Bowden cable are connected to a handle not shown. If the handle is operated, the internal operating lever 13 is thus pivoted in a clockwise direction around its axis area 14. This rotational movement of the internal operating lever 13 is transferred to the pin 16 by means of the contact surface 15. The multifunctional coupling lever 9 hereby rotates around its axis area 10 in an anti-clockwise direction which results in opening of the locking mechanism. The handle is an internal door handle.

The operating arm 17 is, as illustrated in FIG. 1 preferably longer than the distance between the contact surface 15 and the axis area 14 of the internal operating lever 13, viewed from the axis area 14 of the internal operating lever 13. This advantageously contributes to opening with little force expenditure. The lever ratio is preferably 2.5:1 and more. Both lever arms retained by the contact surface 15 and the opening 18 and namely by the axis area 14 of the internal operating lever 13 preferably include, according to FIG. 1, an obtuse angle of greater than 90° and smaller than 180° in order to enable a compact design.

The operating device encompasses a child lock lever 19 which can be pivoted around an axis area 20. If the child lock is engaged, the child lock lever 19 is pivoted in a clockwise direction. A protruding bolt 21 attached to an arm end of the child lock lever 19 and which protrudes vertically from this arm lies adjacent on a securing arm 22 of the multifunctional coupling lever 9 during activation. Movement of the child lock lever 19 is hereby transferred to the multifunctional coupling lever 9 which consequently rotates in a clockwise direction starting from the starting position shown. This rotational movement results in the protruding pin 16 of the multifunctional coupling lever 9 being moved out of the engagement area with the contact surface 15 of the internal operating lever 13. The coupling between the internal operating lever 13 and the multifunctional coupling lever 9 is thus cancelled. Operation of the internal operating lever 13 following uncoupling no longer results in the multifunctional lever 9 executing an operating movement.

By means of provision of a protruding bolt 21 on the child lock lever 19 an extensive contact surface for the lever 22 of the multifunctional coupling lever 9 is advantageously provided without operating an excessive material expense in order to guarantee reliable functioning. By means of this adjacency, the multifunctional coupling lever 9 is also blocked in the activated state of the child lock lever such that it cannot be pivoted around its axis area 10 in the opening direction, i.e. not in an anti-clockwise direction. This is predominantly attained because activation of the child lock lever results in the angle increasing in the direction of 90° which include the lever arm of the child lock lever 19 and the arm 22 of the multifunctional coupling lever 9.

The distance between the axis area 10 of the multifunctional coupling lever 9 and the contact surface between the multifunctional coupling lever 9 and the child lock lever 19 is preferably relatively large, as shown in FIG. 1, compared to the distance between the towing arm 11 and the axis area 10 of the multifunctional coupling lever 9. Hereby, a beneficial lever ratio is provided in order to reliably prevent opening of a door or a flap from the inside when the child lock lever is activated. The lever ratio is 2:1 and larger in particular.

The bolt 21 protruding from the arm of the child lock lever 19 can contact the underside of the operating arm 17 of the internal operating lever 13 in a configuration in the activated state at least in the case of operation of the internal operating lever 13 in order to additionally prevent a relevant door or flap being able to be opened.

The operating device encompasses a central locking lever 23 which can be pivoted around an axis area 24. Pivoting of the central locking lever 23 occurs by means of an electromotor 25, the motor shaft 26 of which is equipped with a wormgear. The wormgear of the motor shaft 26 lies adjacent on a gearwheel-shaped area of the central locking lever 23. Thus, the central locking lever 23 can be pivoted backwards and forwards by means of the electromotor 25. This contributes to the central locking system being able to be electrically activated and deactivated.

The central locking lever 23 has an arm with a laterally protruding locking bolt 27. If the central locking lever 23 is pivoted around its area 24 in an anti-clockwise direction, the locking bolt 27 ultimately lies adjacent on a contact area 28 of a lever arm 29 of the multifunctional coupling lever 9 and subsequently pivots the multifunctional coupling lever 9 in a clockwise direction. In turn, the internal operating lever 13 is uncoupled from the multifunctional coupling lever 9 hereby. Additionally, the multifunctional coupling lever 9 is blocked by the locking bolt 27 of the central bolting lever such that it cannot be pivoted in the opening direction.

The contact surface between the central locking lever 23 and the multifunctional coupling lever 9, which is present in the blocked and then uncoupled state in which the internal operating lever 13 is no longer coupled with the multifunctional coupling lever 9, has a relatively large distance to the axis area 10 of the multifunctional coupling lever 9 and namely compared to the distance between the axis area 10 of the multifunctional coupling lever 9 and the towing arm 11 of the multifunctional coupling lever 9. The lever ratio is in particular at least 2:1, preferably at least 2.5:1, in order to reliably bolt with low force expenditure.

The central locking lever 23 further has an external bolting arm with a bolt 30 which uncouples an external operating lever not shown in FIG. 1 from the locking mechanism by means of a mechanism not illustrated in FIG. 1 if the central locking device is activated.

The operating device furthermore has an anti-theft lock lever 32 which is preferably attached to a gearwheel 33. The anti-theft lock lever 32 can also be pivoted around the axis area 24. The central locking lever 23 and the anti-theft lock lever 32 therefore have a common axis around which the two levers 23 and 32 can be pivoted. This contributes to being able to keep the number of components low and the installation space compact.

An electromotor 34 is provided with a wormgear 35 for pivoting of the anti-theft lock lever 32. The wormgear 35 lies adjacent on the gearwheel 33 so that the anti-theft lock lever 32 can be pivoted backwards and forwards by means of the electromotor 34. If the anti-theft lock lever 32 is pivoted around its axis area 24 in an anti-clockwise direction, one end of an arm 36 of the anti-theft lock lever 32 ultimately lies adjacent to a contact surface 37 of the arm 29. By means of subsequent further movement, the internal operating lever 13 is uncoupled from the multifunctional coupling lever 9. In addition, the multifunctional coupling lever 9 is blocked by the end 36 of the anti-theft lock lever 32 in turn such that it cannot be pivoted in an opening direction.

The contact surface between the anti-theft lock lever 32 and the multifunctional coupling lever 9 which is present when the anti-theft lock is activated, in turn has a greater distance from the axis area 10 of the multifunctional coupling lever 9 compared to the distance between the towing arm 11 of the multifunctional coupling lever 9 and its axis area 10. The lever ratio is in particular 2:1 and more. Hereby, with particular reliability, a vehicle is secured from theft on the basis of relevantly beneficial force ratios.

The contact surface 37 for the anti-theft lock lever 32 is separated by a step from the contact surface 28 for the central locking lever 23 as illustrated in FIG. 1.

The anti-theft lock lever 32 can be expediently coupled by means of a protruding bolt 39 via an arm 38 of the central locking lever 23 in order to, for example, limit a relative movement between the two levers expediently or to enable common pivoting as soon as the bolt 39 lies adjacent on the arm 38.

The anti-theft lock preferably therefore has its own electrical drive 34 independent of the electrical drive 25 for the central locking so that the anti-theft lock cannot simultaneously be operated with the central locking unit. An electromotor generally serves as an electrical drive. However, other electrical drives are also possible.

In an advantageous configuration, the pawl 4 can encompass a limiting arm 40 by means of which the pivoting movements of the pawl 4 are limited on the basis of stops 41 for the limiting arm 40. The stops 41 are preferably attached to the latch plate 2 or carved out of this. The catch can have a pre-ratchet 42 in order to be able to ratchet the pawl in a pre-ratchet position. An optionally provided stop 43 which is preferably attached on the latch plate 2 can limit an overstroke movement of the catch 3.

Due to the use of the multifunctional coupling lever 9 on the one hand five different operating functions can thus be executed and furthermore by means of the formation of the multifunctional coupling lever 9 a customary two-part construction of an internal operating lever can become redundant so that work can take place with only one internal operating lever 13. The multifunctional coupling lever 9 is then a coupling component and an operating lever in one.

As illustrated exemplary in FIG. 1, a first contour of the multifunctional coupling lever 9 therefore interacts with a mechanical child lock. A second contour of the multifunctional coupling lever 9 acts for internal operation and by means of a third contour of the multifunctional coupling lever 9 the anti-theft lock can be engaged electrically. A fourth contour on the multifunctional coupling lever 9 serves to operate the central locking unit and ultimately a fifth contour of the multifunctional coupling lever 9 acts on the triggering lever or directly on the pawl if instead of the triggering lever and the pawl a single-part component 4 is present which unites the functions of the triggering lever and the pawl.

Different advantages result. A first advantage is that all five functions are covered by one lever (the multifunctional coupling lever 9). Furthermore, a second advantage results in the transmission ratio between the triggering lever (or pawl in the case of a corresponding single-component design) multifunctional coupling lever, internal operating lever, such a beneficial transmission ratio that the operating forces can be greatly reduced compared to an usual construction. A third advantage directly results so that due to small forces smaller, i.e. components with small dimensions can be used. And ultimately a fourth advantage results to the extent that a dual component internal operating lever can be dispensed with. The redundancy of the second internal operating lever reduces the weight on the one hand and reduces the number of components necessary for the functions on the other hand.

The internal operating lever 13 therefore generally acts on a, for example cylindrical, ledge or pin 16 on the multifunctional coupling lever 9, for example, whereby the ledge can be disengaged with the internal operating lever by means of the child lock lever. To this end, the multifunctional coupling lever 9 is pivoted in a clockwise direction by means of the child lock lever 19. In the case of a movement of the multifunctional coupling lever 9 by means of the internal operating lever 13 in an anti-clockwise direction the operating contour operates the triggering lever and thus unbolts the locking mechanism. By means of the central locking lever 23 which is driven in a motorized manner, the cylindrical ledge 16 can be disengaged with the internal operating lever 13 in which the central locking unit pivots the multifunctional coupling lever 9 in a clockwise direction. The multifunctional coupling lever 9 has a central-0-spring which always moves the multifunctional coupling lever 9 back into the starting position.

LIST OF REFERENCE SYMBOLS

1: Latching device
2: Latch plate
3: Catch
4: Pawl
5: Catch axis
6: Pawl axis

7: Ratchet arm of the pawl
8: Arresting arm of the catch
9: Multifunctional coupling lever
10: Axis area of the multifunctional coupling lever
11: Towing arm of the multifunctional coupling lever
12: Triggering arm of the pawl
13: Internal operating lever
14: Axis area of the internal operating lever
15: Contact surface of the internal operating lever
16: Protruding pin of the multifunctional coupling lever
17: Operating arm of the internal operating lever
18: Hole at the end of the operating arm of the internal operating lever
19: Child lock lever
20: Axis area for the child lock lever
21: Bolt protruding from one arm of the child lock lever
22: Securing arm of the multifunctional coupling lever
23: Central locking lever
24: Axis area for the central locking lever
25: Electrical drive for the central locking lever
26: Shaft of the electrical drive for the central locking lever
27: Locking bolt of the central locking lever
28: Contact surface of the multifunctional coupling lever for the locking bolt
29: Lever arm of the multifunctional coupling lever
30: Locking bolt of the central locking lever
31: Lever arm of the pawl
32: Anti-theft lock lever
33: Gearwheel of the anti-theft lock lever
34: Electrical drive for the anti-theft lock lever
35: Wormgear of the electrical drive for the anti-theft lock lever
36: Arm end of the anti-theft lock lever
37: Contact surface for the anti-theft lock lever
38: Arm of the central locking lever
39: Bolt of the anti-theft lock lever
40: Limiting arm of the pawl
41: Stops for the limiting arm of the pawl
42: Pre-ratchet of the catch
43: Stop for overstroke limiting of the catch

The invention claimed is:

1. An operating device for opening of a locking mechanism of a motor vehicle latch, the operating device comprising:

an anti-theft lock device, a central locking device, a child lock device, wherein the anti-theft lock device, the central locking device, and the child lock device are formed as independent devices having independent movement relative to each other, and a multifunctional coupling lever which is capable of opening the locking mechanism by an opening movement, where each of the anti-theft lock device, the central locking device, or the child lock device are configured to prevent the opening movement of the multifunctional coupling lever, and wherein the multifunctional coupling lever is separately and directly engageable with each of the locking mechanism, the anti-theft locking device, the central locking device, and the child lock device, wherein the child lock device includes a child lock lever which engages against a securing arm of the multifunctional coupling lever when the child lock device is activated and is configured to block a rotational movement of the multifunctional coupling lever in an opening direction to prevent the opening movement of the multifunctional coupling lever.

2. The operating device according to claim 1, wherein the multifunctional coupling lever is moveable from a starting position into a first direction for opening the locking mechanism and the multifunctional coupling lever is moveable from the starting position into a second direction which disconnects the multifunctional coupling lever from an internal operating lever of the operating device, where in a coupled state, the opening movement of the multifunctional coupling lever is caused by pivoting of the internal operating lever.

3. The operating device according to claim 2, wherein the multifunctional coupling lever is movable into the starting position by a spring.

4. The operating device according to claim 1, wherein the multifunctional coupling lever is movable into the second direction from the starting position by pivoting of the child lock lever of the child lock device, by pivoting of a central locking lever of the central locking device and/or by pivoting of an anti-theft lock lever of the anti-theft lock device.

5. The operating device according to claim 1, comprising a towing arm of the multifunctional coupling lever, which lies adjacent to an axis around which the multifunctional coupling lever is rotatable.

6. The operating device according to claim 5, wherein an internal operating lever has a contact surface which lies adjacent to a laterally protruding pin of the multifunctional coupling lever for transfer of a movement of the internal operating lever to the multifunctional coupling lever to cause the opening movement.

7. The operating device according to claim 1, wherein the anti-theft lock device includes an anti-theft lock lever which lies adjacent to a contact surface of the multifunctional coupling lever when the anti-theft device is engaged and prevents the opening movement of the multifunctional coupling lever.

8. The operating device according to claim 7 further comprising an electrical drive for pivoting the anti-theft lock lever.

9. The operating device according to claim 1, wherein the central locking device includes a central locking lever which is capable of lying adjacent to a contact surface of the multifunctional coupling lever for prevention of the opening movement.

10. The operating device according to claim 9, further comprising an electrical drive for pivoting the central locking lever.

11. The operating device according to claim 1, wherein the central locking device includes a central locking lever.

12. The operating device according to claim 1, wherein an anti-theft lock lever of the anti-theft lock device and a central locking lever of the central locking device are rotatably mounted on a common axis.

13. A motor vehicle latch with an operating device according to claim 1, and a locking mechanism comprising a catch and a pawl, wherein axes of rotatably mounted components of the operating device are vertically aligned to axes of the catch and the pawl.

14. A motor vehicle latch with an operating device according to claim 1, wherein the anti-theft device cannot simultaneously be operated with the central locking device.

* * * * *